Patented Mar. 15, 1938

2,111,208

UNITED STATES PATENT OFFICE 2,111,208

MANUFACTURE OF ACETALDEHYDE

Henry Dreyfus, London, England

No Drawing. Application August 22, 1932, Serial No. 629,895. In Great Britain September 11, 1931

13 Claims. (Cl. 260—138)

This invention relates to the manufacture of acetaldehyde by the oxidation and/or dehydrogenation of ethyl alcohol.

The manufacture of acetaldehyde is carried out on a large scale by the catalytic oxidation and/or dehydrogenation of ethyl alcohol in the vapour phase. In performing this reaction it is usually convenient to employ ethyl alcohol containing at least a small quantity of water, which normally appears unchanged in the reaction products. Further, the oxidation reaction produces one molecule of water for every molecule of aldehyde formed. In consequence the reaction products usually contain substantial quantities of water, which renders them unsuitable for use in a number of manufactures, e. g. the oxidation of aldehyde to acetic acid, unless steps are taken to remove the water.

According to the invention water is separated from the vaporous reaction products either partially or substantially completely, thus affording a means of obtaining a product comprising anhydrous acetaldehyde, or acetaldehyde mixed with any definite desired amount of water.

In a very important method of carrying the invention into effect the water vapour is partly or substantially completely removed from the reaction vapours by means of water binding substances, the aldehyde being subsequently condensed or otherwise recovered from the reaction vapours. The use of water binding substances according to the invention is especially advantageous when the alcohol is oxidized and/or dehydrogenated in presence of large quantities of water in order better to control the heat evolution in the reaction, as described in my U. S. application S. No. 629,894 filed on even date herewith.

In performing the invention the reaction vapours may be treated continuously with the water binding substances in any convenient way. Preferably the water binding substances are maintained at temperatures sufficiently high to prevent any substantial condensation of water, as in such cases the water can be effectively absorbed from the reaction vapours without any substantial condensation of the aldehyde from the vapours. The invention is, however, not limited to the employment of such temperatures, as temperatures below the boiling point of water may be employed for the purposes of the invention.

The water binding substances are preferably employed, so far as is consistent with the maintenance of the acetaldehyde in the vapour phase, at temperatures at which they exert a high affinity for water, and most advantageously at temperatures at which they exert their maximum affinity for water. The water binding substances will, of course, be employed at temperatures below those at which water (whether water chemically bound or water of crystallization) would be driven off from the products resulting from their absorption of water.

Calcium chloride, either anhydrous or already more or less hydrated is particularly suitable for the purposes of the invention. Other substances having affinity, and especially those having high affinity for water, can, however, be usefully employed. For example, barium or magnesium chlorides, copper sulphate, magnesium sulphate and the like may be used. Substances such as sulphuric acid or zinc chloride which are liable to have a deleterious action upon the aldehyde vapour should, of course, not be employed.

In performing the invention the water binding substances may be employed in the solid, liquid, or molten condition, and may, if desired, be subjected to stirring or other agitation. The water binding substances can be regenerated after removal from the absorption zone or, if desired, they may be regenerated continuously with the reaction. For example, especially when employed in the liquid form or in the molten state, they may be caused to circulate continuously from the absorption zone to a regeneration apparatus and then returned to the absorption zone. The regeneration may be effected for example by heating the water binding substances to remove the water absorbed thereby.

Subsequent to the removal of water from the reaction vapours, the said vapours may be treated in any convenient way to recover the aldehyde, for instance by subjecting the vapours to condensation by cooling or to absorption in solvents. Thus, for instance, when the aldehyde is to be employed for the subsequent oxidation to acetic acid or other chemical reaction upon the aldehyde, the aldehyde may advantageously be absorbed from the reaction vapours in an anhydrous solvent, for example glacial acetic acid, that is not liable to interfere with the subsequent reaction.

For the catalytic oxidation of the alcohol to aldehyde, temperatures between about 300° and 500° C. and especially 400° and 450° C. are in general very useful. Silver, copper, silver oxide and copper oxide may be mentioned as instances of catalysts very useful for promoting the reaction. Advantageously the alcohol vapour is diluted with steam, nitrogen or other indifferent gases in order to avoid or minimize side reactions or decomposition. The oxygen or air may be employed in amounts equal to that theoretically necessary, or in amounts greater or less than this.

One very convenient way of putting the invention into practice is as follows. Ethyl alcohol of about 95% concentration is vaporized with the desired amount of air and passed in the usual way through a hot reaction tube containing a suitable catalyst such as silver or copper. The vapours from the reaction zone are partially cooled, and caused to traverse a number of tubes arranged in banks, heated to about 120° C. and charged with anhydrous calcium chloride. These tubes are so arranged that when one bank ceases to absorb water efficiently, another bank can be brought into operation while the "spent" calcium chloride in the first bank may be regenerated by being heated, preferably in a current of air, to a temperature exceeding 200° C. until the anhydrous form of the salt is again obtained. In order to obtain greater efficiency and economy in working, it is advantageous to arrange the tubes in each bank so that the reaction vapours traverse successively tubes containing calcium chloride that has already absorbed a certain amount of water, then tubes containing the calcium chloride in a less hydrated form, and finally tubes containing calcium chloride substantially in the anhydrous state. By operating in this way a practically anhydrous acetaldehyde is readily obtained from ethyl alcohol in a simple and continuous manner.

It is, however, understood that the process of the invention may if desired be performed in any other convenient way, and that the method described above is given solely by way of example.

The term "oxidation" is used in the claims in its broad sense, to denote any reaction in which the proportion of oxygen in a compound is increased, or the proportion of hydrogen is decreased, whatever be the precise mechanism whereby such change is effected.

What I claim and desire to secure by Letters Patent is:—

1. In the process for the manufacture of acetaldehyde by oxidation of ethyl alcohol, the step of at least partially removing the water present in the products of oxidation, without any substantial removal of the acetaldehyde, before condensation of the acetaldehyde, and thereafter condensing the acetaldehyde in liquid form.

2. In the process for the manufacture of acetaldehyde by oxidation of ethyl alcohol, the step of at least partially removing the water present in the products of oxidation, without any substantial removal of the acetaldehyde, by means of a water binding agent, having no deleterious effect on the acetaldehyde, before condensation of the acetaldehyde, and thereafter condensing the acetaldehyde in liquid form.

3. In the process for the manufacture of acetaldehyde by oxidation of ethyl alcohol, the step of at least partially removing the water present in the products of oxidation, without any substantial removal of the acetaldehyde, by means of calcium chloride before condensation of the acetaldehyde, and thereafter condensing the acetaldehyde in liquid form.

4. In the process for the manufacture of acetaldehyde by oxidation of ethyl alcohol, the step of at least partially removing the water present in the products of oxidation, without any substantial removal of the acetaldehyde, by means of a water binding agent, having no deleterious effect on the acetaldehyde, at a temperature above the boiling point of water, and thereafter condensing the acetaldehyde in liquid form.

5. In the process for the manufacture of acetaldehyde by oxidation of ethyl alcohol, the step of at least partially removing the water present in the products of oxidation, without any substantial removal of the acetaldehyde, by means of calcium chloride at a temperature above the boiling point of water before condensation of the aldehyde, and thereafter condensing the acetaldehyde in liquid form.

6. In the process for the manufacture of acetaldehyde by oxidation of ethyl alcohol, the step of at least partially removing the water present in the products of oxidation, without any substantial removal of the acetaldehyde before condensation of the acetaldehyde by means of a water binding agent, in a liquid state, which has no deleterious effect on the acetaldehyde, and thereafter condensing the acetaldehyde in liquid form.

7. In the process for the manufacture of acetaldehyde by oxidation of ethyl alcohol, the step of at least partially removing the water present in the products of oxidation, without any substantial removal of the acetaldehyde, by means of a water binding agent in a liquid state at a temperature above the boiling point of water, said water binding agent having no deleterious effect on the acetaldehyde and thereafter condensing the acetaldehyde in liquid form.

8. In the process for the manufacture of acetaldehyde by oxidation of ethyl alcohol, the step of at least partially removing the water present in the products of oxidation, without any substantial removal of the acetaldehyde, by means of a solution of calcium chloride before condensation of the acetaldehyde and thereafter condensing the acetaldehyde in liquid form.

9. In the process for the manufacture of acetaldehyde by oxidation of ethyl alcohol, the step of at least partially removing the water present in the products of oxidation, without any substantial removal of the acetaldehyde by means of a solution of calcium chloride at a temperature above the boiling point of water and thereafter condensing the acetaldehyde in liquid form.

10. In the process according to claim 6, the further step of causing the water binding agent to circulate continuously from the absorption zone to a regeneration zone and back to the absorption zone.

11. In the process according to claim 8, the further step of causing the water binding agent to circulate continuously from the absorption zone to a regeneration zone and back to the absorption zone.

12. Process for the manufacture of acetaldehyde which comprises oxidizing ethyl alcohol and leading the vapors from the reaction zone in contact with calcium chloride at a temperature of 100° to 150° C. so as to at least partially remove the water present in the resultant product without any substantial removal of the acetaldehyde formed, and subsequently condensing the acetaldehyde in liquid form.

13. Process for the manufacture of acetaldehyde which comprises oxidizing ethyl alcohol in the presence of water vapor, leading the vapors from the reaction zone in contact with calcium chloride at a temperature of 100° to 150° C. so as to at least partially remove the water present in the resultant product without any substantial removal of the acetaldehyde formed, and subsequently condensing the acetaldehyde in liquid form.

HENRY DREYFUS.